United States Patent
Khoo

(10) Patent No.: US 12,363,057 B1
(45) Date of Patent: Jul. 15, 2025

(54) SYSTEM AND METHOD FOR PROCESSING OF SPEECH CONTENT IN EMAIL MESSAGES

(71) Applicant: Justin Khoo, San Francisco, CA (US)

(72) Inventor: Justin Khoo, San Francisco, CA (US)

(*) Notice: Subject to any disclaimer, the term of this patent is extended or adjusted under 35 U.S.C. 154(b) by 0 days.

(21) Appl. No.: 16/518,451

(22) Filed: Jul. 22, 2019

Related U.S. Application Data

(60) Provisional application No. 62/711,469, filed on Jul. 27, 2018, provisional application No. 62/701,609, filed on Jul. 20, 2018.

(51) Int. Cl.
| | |
|---|---|
| *H04L 51/10* | (2022.01) |
| *G10L 13/00* | (2006.01) |
| *H04L 51/224* | (2022.01) |

(52) U.S. Cl.
CPC .............. *H04L 51/10* (2013.01); *G10L 13/00* (2013.01); *H04L 51/224* (2022.05)

(58) Field of Classification Search
CPC ........ H04L 51/10; H04L 51/24; G10L 13/043
See application file for complete search history.

(56) References Cited

U.S. PATENT DOCUMENTS

| | | | |
|---|---|---|---|
| 6,707,891 B1* | 3/2004 | Guedalia | H04M 3/5307 |
| | | | 709/228 |
| 6,907,578 B2 | 6/2005 | Wilson et al. | |
| 6,918,082 B1 | 7/2005 | Gross et al. | |
| 7,219,131 B2 | 5/2007 | Banister et al. | |
| 7,305,242 B2 | 12/2007 | Zakharia et al. | |
| 7,627,814 B1 | 12/2009 | Soldan et al. | |
| 7,814,410 B2 | 10/2010 | Kothari et al. | |
| 7,900,149 B2 | 3/2011 | Hatcher et al. | |
| 8,032,597 B2 | 10/2011 | Khoo | |
| 8,285,813 B1 | 10/2012 | Colton et al. | |
| 8,335,982 B1 | 12/2012 | Colton et al. | |
| 8,527,860 B1 | 9/2013 | Colton et al. | |
| 8,639,680 B1 | 1/2014 | Ciccolo et al. | |
| 8,639,743 B1 | 1/2014 | Colton et al. | |
| 8,719,451 B1 | 5/2014 | Colton et al. | |
| 8,898,296 B2 | 11/2014 | Zeng et al. | |
| 8,959,426 B1 | 2/2015 | Thakare et al. | |
| 8,984,048 B1 | 3/2015 | Maniscalco et al. | |
| 9,166,977 B2* | 10/2015 | Desai | H04L 9/3247 |
| 9,218,267 B1 | 12/2015 | Keller | |
| 9,400,774 B1 | 7/2016 | Kim et al. | |

(Continued)

OTHER PUBLICATIONS

Campaign Wokhub, "The Only Proofing Solution Built for Email Campaigns", Available Online at <http://campaignworkhub.com:80/>, Accessed on Oct. 2, 2015, 5 pages.

(Continued)

*Primary Examiner* — Chris Parry
*Assistant Examiner* — Steven C Nguyen
(74) *Attorney, Agent, or Firm* — Nicholson De Vos Webster & Elliott LLP

(57) ABSTRACT

A system and method to provide email content within a separate part of an email, where the content is optimized for speaking and audio playback. Embodiments of the invention are methods for a speech-enabled email client to identify and use substitute speech content when outputting audio or reading to a user instead of the regular HTML or text parts of an email.

18 Claims, 6 Drawing Sheets

(56) References Cited

U.S. PATENT DOCUMENTS

| | | | |
|---|---|---|---|
| 9,424,236 B2 | 8/2016 | Sullivan et al. | |
| 9,607,332 B1 | 3/2017 | Nazarov et al. | |
| 9,817,916 B2 | 11/2017 | Flack | |
| 10,031,549 B2 | 7/2018 | Costa | |
| 2001/0042098 A1 | 11/2001 | Gupta et al. | |
| 2004/0034688 A1 | 2/2004 | Dunn | |
| 2004/0193441 A1 | 9/2004 | Altieri | |
| 2004/0234169 A1 | 11/2004 | Tojo | |
| 2004/0268261 A1 | 12/2004 | Elliott et al. | |
| 2005/0022116 A1 | 1/2005 | Bowman et al. | |
| 2005/0081159 A1 | 4/2005 | Gupta et al. | |
| 2005/0100143 A1* | 5/2005 | Bedingfield | H04M 11/10 379/88.12 |
| 2005/0246341 A1 | 11/2005 | Vuattoux et al. | |
| 2006/0023238 A1 | 2/2006 | Blaszyk et al. | |
| 2006/0174187 A1 | 8/2006 | White et al. | |
| 2006/0210028 A1* | 9/2006 | Ng | H04M 1/72436 379/88.14 |
| 2007/0011258 A1 | 1/2007 | Khoo | |
| 2007/0038718 A1 | 2/2007 | Khoo et al. | |
| 2007/0073848 A1* | 3/2007 | Fratti | G06Q 10/107 709/220 |
| 2007/0174396 A1* | 7/2007 | Kumar | G06Q 10/107 709/206 |
| 2007/0201752 A1 | 8/2007 | Gormish et al. | |
| 2007/0211071 A1 | 9/2007 | Slotznick et al. | |
| 2008/0005247 A9 | 1/2008 | Khoo | |
| 2008/0178073 A1 | 7/2008 | Gao et al. | |
| 2008/0307328 A1 | 12/2008 | Hatcher et al. | |
| 2009/0055187 A1* | 2/2009 | Leventhal | G10L 13/00 704/260 |
| 2009/0112687 A1 | 4/2009 | Blair et al. | |
| 2009/0190728 A1* | 7/2009 | Bushnell | H04M 3/533 379/88.17 |
| 2009/0240497 A1* | 9/2009 | Usher | G10L 13/00 704/235 |
| 2009/0254345 A1* | 10/2009 | Fleizach | G10L 13/00 704/260 |
| 2010/0031366 A1 | 2/2010 | Knight et al. | |
| 2010/0241488 A1 | 9/2010 | Jacobson | |
| 2011/0065376 A1 | 3/2011 | Forutanpour et al. | |
| 2011/0113364 A1 | 5/2011 | Neil et al. | |
| 2011/0197133 A1 | 8/2011 | Tarjan et al. | |
| 2011/0202621 A1 | 8/2011 | Laval | |
| 2011/0258532 A1 | 10/2011 | Ceze et al. | |
| 2011/0314368 A1 | 12/2011 | Chevalier | |
| 2012/0110395 A1 | 5/2012 | Gearhart et al. | |
| 2012/0155292 A1 | 6/2012 | Zazula et al. | |
| 2012/0173967 A1 | 7/2012 | Lillesveen | |
| 2012/0212501 A1 | 8/2012 | Berkland et al. | |
| 2012/0215540 A1* | 8/2012 | Goktekin | H04L 51/066 704/260 |
| 2012/0245937 A1* | 9/2012 | Thenthiruperai | H04M 1/72552 704/235 |
| 2012/0278695 A1 | 11/2012 | Ju et al. | |
| 2012/0278700 A1 | 11/2012 | Sullivan et al. | |
| 2013/0007711 A1 | 1/2013 | Fryc et al. | |
| 2013/0046616 A1 | 2/2013 | Williams et al. | |
| 2013/0174010 A1 | 7/2013 | Le et al. | |
| 2013/0174011 A1 | 7/2013 | Le et al. | |
| 2013/0176344 A1 | 7/2013 | Mandic et al. | |
| 2013/0179776 A1 | 7/2013 | Rossi et al. | |
| 2013/0190021 A1* | 7/2013 | Vieri | H04W 4/14 455/466 |
| 2013/0197902 A1* | 8/2013 | Nazarian | G10L 21/00 704/201 |
| 2013/0201107 A1 | 8/2013 | Rossi et al. | |
| 2013/0205277 A1 | 8/2013 | Seven et al. | |
| 2013/0219024 A1 | 8/2013 | Flack | |
| 2013/0290786 A1 | 10/2013 | Artzi et al. | |
| 2013/0325980 A1 | 12/2013 | Ohayon | |
| 2014/0123036 A1 | 5/2014 | Bao et al. | |
| 2014/0136944 A1 | 5/2014 | Harris et al. | |
| 2014/0282076 A1 | 9/2014 | Fischer | |
| 2014/0335833 A1* | 11/2014 | Woloshyn | H04M 1/72433 455/412.2 |
| 2015/0074518 A1 | 3/2015 | Rumsey et al. | |
| 2015/0082058 A1 | 3/2015 | Hahm et al. | |
| 2015/0161087 A1 | 6/2015 | Khoo | |
| 2015/0180811 A1 | 6/2015 | Cornwell et al. | |
| 2015/0207804 A1 | 7/2015 | Van et al. | |
| 2015/0242380 A1 | 8/2015 | Guo et al. | |
| 2015/0309993 A1 | 10/2015 | Wilde | |
| 2016/0086620 A1* | 3/2016 | Ostermann | G09B 21/009 704/235 |
| 2016/0132937 A1 | 5/2016 | Khoo et al. | |
| 2016/0259773 A1 | 9/2016 | Jadhav et al. | |
| 2016/0284341 A1* | 9/2016 | Hirakawa | G10L 13/04 |
| 2017/0018021 A1 | 1/2017 | Shekhawat et al. | |
| 2018/0090126 A1* | 3/2018 | Peterson | G10L 13/08 |
| 2018/0247640 A1* | 8/2018 | Yassa | G06N 3/0454 |
| 2019/0044902 A1 | 2/2019 | Teplow et al. | |
| 2019/0073342 A1 | 3/2019 | Wilson et al. | |
| 2020/0151223 A1* | 5/2020 | Ly | H04M 1/72547 |
| 2020/0388269 A1* | 12/2020 | Niehaus | H04L 51/18 |
| 2021/0209121 A1* | 7/2021 | Liu | G06F 16/24578 |

OTHER PUBLICATIONS

Conceptshare—Tour, "Five Favorite Features Chosen by Customers", Available Online at <https://www.conceptshare.com/tour>, accessed on Oct. 27, 2018, 4 pages.

Dave, Shyamal, "Head to Litmus for Email Testing and Marketing Analytics Needs", Available Online at <https://yourstory.com/2012/08/litmus>, Aug. 13, 2012, 2 pages.

Deltek + Conceptshare, "New Feature List", Available Online at <http://www.conceptshare.com/new_features>, accessed on Oct. 29, 2018, 7 pages.

Email on Acid, "How Can I Run an Email Test?", Available Online at <https://www.emailonacid.com/help-article/how-can-i-run-an-email-test/>, accessed on Oct. 27, 2018, 9 pages.

Garsiel et al., "How Browsers Work: Behind the Scenes of Modern Web Browsers", Available Online at <https://www.html5rocks.com/en/tutorials/internals/howbrowserswork/>, Aug. 5, 2011, 55 pages.

Invision, "Free Design Feedback and Collaboration Tool", Available Online at <https://www.invisionapp.com/tour/design-feedback-collaboration-tool/>, accessed on Oct. 27, 2018, 5 pages.

IPhoneHacks, "How to Use a Mouse on Your iPad & iPhone [Jailbreak Tips]", Available Online at <https://www.iphonehacks.com/2012/10/how-to-use-a-mouse-on-the-ipad.html>, Oct. 7, 2012, 9 pages.

Litmus, "Verify and Check Your Email with Litmus Checklist", Available Online at <https://litmus.com/email-checklist#0>, accessed on Oct. 27, 2018, 7 pages.

Mark Goddard, "Fixing the HOver Event on the iPad/iPhone/iPod", Available Online at <http://blog.0100.tv/2010/05/fixing-the-hover-event-on-the-ipadiphoneipod/>, 2010, 6 pages.

Merriam-Webster, "Definition of Disable", Available Online at <https://www.merriam-webster.com/dictionary/disable#:~:text=%3A%20to%20make%20unable%20or%20incapable%20He%20disabled%20the%20computer%20system.>, accessed on Feb. 1, 2021, 12 pages.

Motto, Todd, "Building an HTML5 Responsive Menu with Media Queries and JavaScript—Ultimate Courses", Available Online at <https://ultimatecourses.com/blog/building-an-html5-responsive-menu-with-media-queries-javascript>, accessed on Feb. 1, 2021, 14 pages.

Notice of Allowance, U.S. Appl. No. 16/361,140, Mar. 30, 2021, 5 pages.

Notice of Allowance, U.S. Appl. No. 16/403,322, Mar. 24, 2021, 8 pages.

Notice of Allowance, U.S. Appl. No. 15/696,152, Mar. 25, 2021, 8 pages.

Notice of Allowance, U.S. Appl. No. 15/696,152, Dec. 16, 2020, 9 pages.

Notice of Allowance, U.S. Appl. No. 16/361,140, May 18, 2021, 9 pages.

(56) References Cited

OTHER PUBLICATIONS

Pelago, "Sidecar: Emogrifier", Available Online at <https://web.archive.org/web/20130425165247/http://www.pelagodesign.com/sidecar/emogrifier/>, Apr. 25, 2013, 2 pages.
Radford. Edu, "Style Sheet Locations for COMS326", Available Online at <https://www.radford.edu/~rstepno/326/csslocations.html>, Mar. 30, 2013, 2 pages.
taligarsiel.com, "Behind the Scenes of Modern Web Browsers", Available Online at <http://taligarsiel.com/Projects/howbrowserswork1.htm>, 27 pages.
W3C Working Draft, "Document Object Model (DOM) Level 3 Events Specification", Available Online at <https://www.w3.org/TR/2013/WD-DOM-Level-3-Events-20131105/>, Nov. 2, 2013, 88 pages.
Wilson et al, "Touch and Mouse: Together Again for the First Time", Available Online at <https://www.html5rocks.com/en/mobile/touchandmouse/>, Mar. 13, 2013, 10 pages.
Email Previews, Screen captures of Litmus.com Web Site, https://litmus.com/email-testing, accessed Jun. 13, 2018 (12 pages).
Non-Final Office Action, U.S. Appl. No. 17/361,234, Feb. 18, 2022, 11 pages.
Non-Final Office Action, U.S. Appl. No. 18/045,163, May 15, 2023, 34 pages.
Notice of Allowance, U.S. Appl. No. 17/361,234, Jun. 8, 2022, 8 pages.
Notice of Allowance, U.S. Appl. No. 17/409,487, Oct. 7, 2022, 13 pages.
Rice, Jerry, "LifeFX lives on online", Magazine, Aug. 9, 2001, 11 pages, Variety, Los Angeles, California, USA, Accessed Aug. 16, 2024, URL: https://variety.com/2001/digital/features/lifefx-lives-on-online-1117851059/.
"BIMI Record—What is it? How Does it Add to DMARC?", Article, 2 pages, MX Toolbox, Austin, Texas, USA, Accessed Aug. 16, 2024, URL: https://mxtoolbox.com/dmarc/details/bimi-record/what-is-a-bimi-record.

* cited by examiner

Fig. 5

501 — From: Uber <uber@newsletters.uber.com>
502 — To: Joe <joe@gmail.com>
503 — Subject: Shop new scarfs at the at the Hermes store this Saturday.
504 — X-Speech-Subject-SSML: Shop new scarfs at the at the <phoneme alphabet="ipa" ph="/ɛərˈmɛz/">Hermes</phoneme> store Saturday.
505 — X-Audible-Sender-DNS: SPEECH1
506 — X-Sender-Name-Phoneme: alphabet="ipa", ph="/ˈuːbəɹ/"
507 — X-From-Name-Audio-URL: url="https://server.com/uber-audio.mp3"
Content-Type: multipart/alternative; boundary=abc000000

508 — --abc000000
Content-Type: text/plain; charset="UTF-8";

509 — This is a plain text body part of the email
--abc000000
Content-Type: text/html; charset="UTF-8"

510 — <p>This is an <b>HTML formatted</b> body part of the email</p>
--abc000000
Content-Type: x-speech-synthesis/ssml <speak>Get to the <phoneme alphabet="ipa" ph="/ɛərˈmɛz/">Hermes</phoneme> store this Saturday where there are lots of new styles to try out!</speak>
511 — --abc000000
Content-Type: x-speech-playback/mp3
Content-transfer-encoding: base64

T2dnUwACAAAAAAAAAAAA... (truncated for brevity)
512 — --abc000000
Content-Type: x-speech-synthesis/ssml-url url:http://server.com/speech-content.ssml
513 — --abc000000
Content-Type: x-speech-playback/mp3-url url:http://server.com/speech-content.mp3
--abc000000--

```
601  <html>
602  <body>
603  <h1>This is the title of the Email</h1>
     This is visible text and <b>HTML</b> that is displayed in non-speech-enabled email clients.
604  <!--[SPEECH]
605  <speech-block>
606  <sender-name alphabet="ipa" ph="/nju:'εg/">NewEgg</sender>
607  <subject format="ssml">Shop new laptops at the <phoneme alphabet="ipa" ph="/nju:'εg/">NewEgg</phoneme> store Saturday.</subject>
608  <speech-body>Get to the <phoneme alphabet="ipa" ph="/nju:'εg/">NewEgg</phoneme> store this Saturday where there are lots of new laptops check out!</speech-body>
609  <speech-body-url>http://server.com/speech-content.mp3</speech-body-url>
610  <engagement-beacon>https://tracking-server.com?email=1230123&recipient=joe@gmail.com</engagement-beacon>
611  <speech-section label="new arrivals">This month we have some new laptops</speech-section>
612  <speech-section label="personalized">Just for you, new Bose soundbars to complement your TV purchase</speech-section>
613  <speech-section label="sales">Laptop memory and HDMI cables are on sale this week.</speech-section>
614  </speech-block>
     -->
     </body>
     </html>
```

Fig. 6

SYSTEM AND METHOD FOR PROCESSING OF SPEECH CONTENT IN EMAIL MESSAGES

PRIORITY

This application claims priority under 35 U.S.C. § 119(e) to U.S. Provisional Application No. 62/701,609, filed Jul. 20, 2018 and to U.S. Provisional Application No. 62/711,469, filed Jul. 27, 2018, both of which are incorporated by reference herein in their entirety.

FIELD

The present invention relates to email, and more particularly to sending, receiving, and presenting email that has containing multiple parts, one of the multiple parts being a speech part that contains information that can be played as audible speech.

BACKGROUND

There are voice assistants such as Apple's Siri and Amazon's Alexa that have the capability to read emails and output or play the content as speech. Some voice assistants have or can be installed with speech enhanced email clients that can read emails to a user and recognize a user's request through speech recognition. Normally when reading emails, the voice assistants' speech-enabled email clients merely convert the HTML or plain text of the email directly into speech, using for example, conventional text to speech technology. This approach comes with a few shortcomings. Firstly, email content may be long and speech-enabled email clients do not have the ability to skim a message, forcing listeners to listen from the beginning. Secondly the conversion, especially from HTML, may not be optimal, as HTML content may be rearranged visually using Cascading Style Sheets and merely reading from the top of to the bottom may not result in a meaningful output.

There have been attempts to solve the issue by embedding speech markers within a body part of an email content to aid the conversion of an email to speech such as provided in U.S. Pat. No. 8,189,746. The tags are detected by a system that renders email as speech, such as voice command platform or network-based virtual assistant or message center. For example, the system can detect the signature block or privacy notice tags and not render the signature block or privacy notice as speech. But the '746 patent does not indicate how to pronounce the speech or how to optimize the message content for speech. The '746 patent does not allow for alternate versions of the content that is optimized for speech.

BRIEF DESCRIPTION OF THE DRAWINGS

FIG. 5 shows a source of an exemplary speech enhanced email message containing alternative parts that may be present in an email message for reading, in accordance with an embodiment of the present invention.

FIG. 6 shows a source of an HTML part of an exemplary speech enhanced email message wherein speech content is embedded within HTML, containing alternative parts that may be present in an email message for reading, in accordance with an embodiment of the present invention.

DETAILED DESCRIPTION OF EMBODIMENTS OF THE INVENTION

In certain kinds of emails, especially promotional email, it would be advantageous to provide an alternative version of the email content within a separate part of the email that is optimized for speaking and audio playback.

Embodiments of the invention discloses methods for a speech-enabled email client to identify and use substitute speech content when outputting audio or reading to a user instead of the regular HTML or text parts of an email.

In the description herein and in the accompanying drawings, reference is made to particular features of various embodiments of the invention. Where a particular feature is disclosed in the context of a particular aspect or embodiment of the invention, that feature can also be used, to the extent possible, in combination with and/or in the context of other particular aspects and embodiments of the invention, and in the invention generally.

The system of the present invention performs numerous functions in providing for the transmission, identification and auditory rendering of speech enhanced email content to a user. These functions are preferably divided up and encapsulated into a number of server and client applications. Each application is configured to retrieve and manipulate information in storage devices and exchange information through a network.

Although the schematic overview shows application and storage systems tied to physical servers, multiple instances of the applications may be deployed over multiple servers, which may themselves be virtualized instances running on shared hardware resources connected to a Network. One of ordinary skill in the art would understand that any number of computing devices could be used as servers, and embodiments of the present invention are contemplated for use with any such computing device or distributed network of such devices that may be sharing common resources.

Embodiments will now be described with reference to FIG. 1-4, which in general relate to a system and method for providing speech-enabled email clients with a capability for selecting parts of an email to render as speech and audio.

Figure 1:
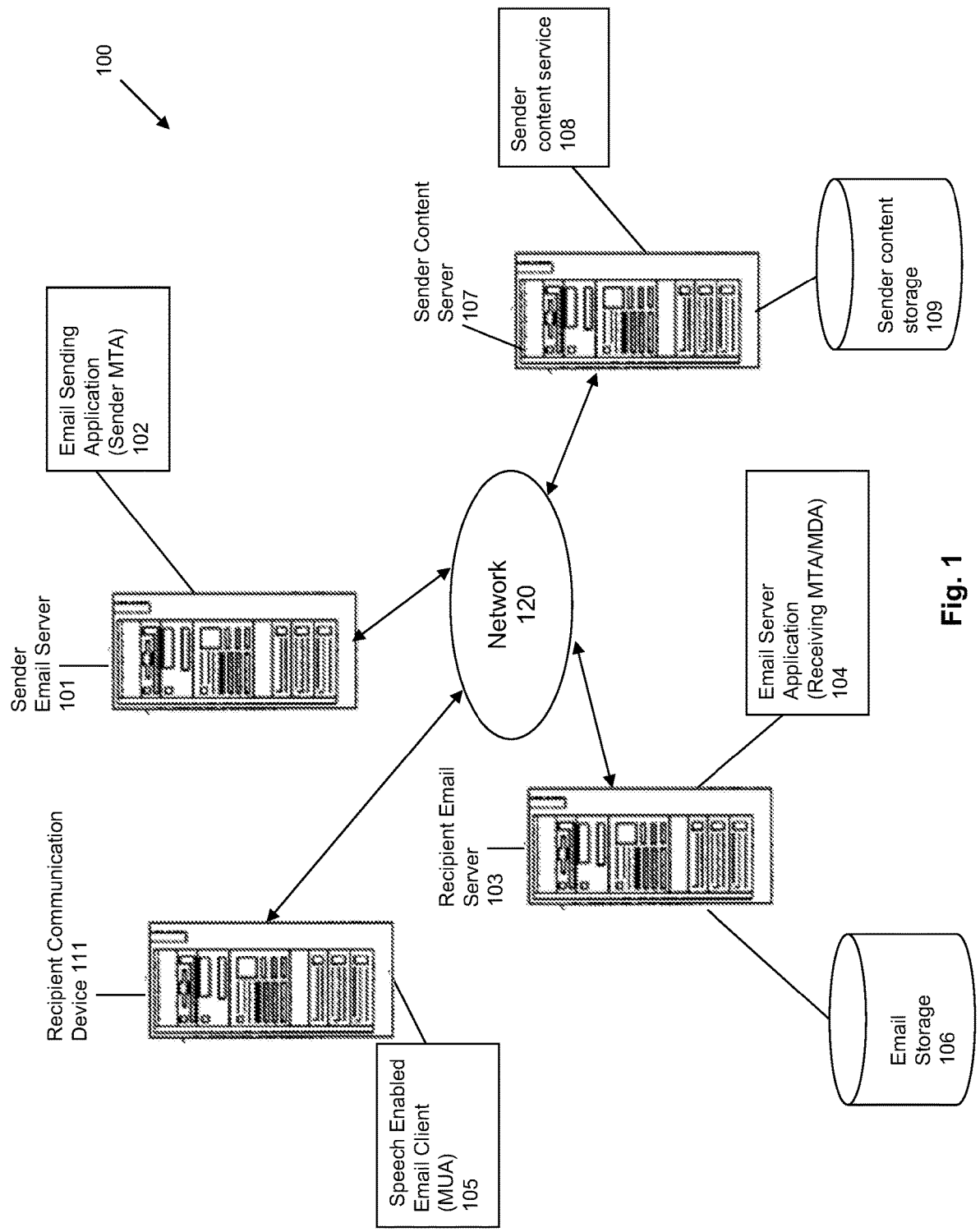
FIG. 1 illustrates a network schematic of a system, in accordance with an embodiment of the present invention.

Referring initially to FIG. 1, there is shown an embodiment for implementing the present technology including a sender's email server 101, a recipient's email server 103, a sender content server 107 and one or more recipient's communication devices 111 capable of receiving or accessing electronic mail. The system 100 is coupled together by network 120. Network 120 can include any type of wire or wireless communication channel capable of coupling together computer systems. This includes, but is not limited to, a local area network, a wide area network, or a combination of networks. In one embodiment of the present invention, network 120 includes the Internet. While one server sender's email server, recipient's email server, and sender content server are shown, more than one sender's email server, recipient's email server, one or more recipient communication devices may be used in further embodiments.

Sender content server 107 may be used to process requests for content from recipient email server 103, and recipient communication device 111. Sender content server 107, can be running an operating system, which can be any commercially-available or otherwise appropriate operating system. Sender content server 107 can also run a variety of server applications, including HTTP servers, FTP servers, CGI servers, database servers, JAVA servers, audio streaming servers and the like. Sender content server 107 may be coupled to a sender content service 108 that processes request for speech or audio content and retrieves content from a sender content storage 109. Sender content storage 109 stores remote content referred by the email like 506 and 513 and optionally the audio-file and chimes referenced by the DNS record.

Sender email server 101 may be used to send emails to recipient email servers 103 and recipient communication devices 111, such as a computer or wireless device. Sender email server 101, can be running an operating system, which can be any commercially-available or otherwise appropriate operating system. Sender email server 101, which can, in addition to an operating system, include and email sending application (e.g., sender Message Transfer agent (MTA)) 102.

Recipient email server 103 may be used to receive emails from sender email server 101. Recipient email server 103, can be running an operating system. Recipient email server 103, which can, in addition to an operating system, include an email receiving application (e.g., Message Transfer Agent/Mail Delivery Agent (MTA/MDA)) 104, accessible by a speech-enabled email client 105 coupled to recipient communication device 111.

The exemplary system 100, illustrates how an email from an email sending application 102 is sent via sender email server 101 to be received at recipient email server 103 by an email server receiving application MTA 104 or Message Transfer Agent (MTA) 104, such as Postfix™ or Sendmail™, and stored in an email storage 106 to allow a user access to their emails. When a user accesses their email, the user uses a speech-enabled email client application or speech-enabled Message User Agent (MUA) such as Apple's Siri or Amazon's Alexa. It can be appreciated that speech-enabled email clients may comprise modules executing on multiple devices, such that certain modules may reside on a recipient communication device 111 such as a smart phone for user interaction and certain modules may reside on a separate remote server connected over a network to process voice commands.

Data may be provided to the system, stored by the system and provided by the system to users of the system across local area networks (LANs) (e.g., office networks, home networks) or wide area networks (WANs) (e.g., the Internet). The system may comprise numerous servers communicatively connected across one or more LANs and/or WANs. One of ordinary skill in the art would appreciate that there are numerous manners in which the system could be configured, and embodiments of the present invention are contemplated for use with any configuration.

As used herein, the term "server" is used to refer to any type of data processing device that is connected to a node on a network for providing services to client devices on the network. Servers are data processing systems, such as, for example, a data processing system having a processor and memory that performs actions specified by software programs stored within the memory. The term "speech-enabled email client" relates to any application supporting the ability of a user interacting with the application using speech to read email messages. Speech-enabled email clients may also support multi-modal capability wherein said client may display information on a screen and a user may optionally interact with said displayed content by touching or clicking on elements of said screen. The "email client" can also reside on any device, but not limited to, a PC, a mobile device, a tablet and a watch. Thus, email clients are data processing systems, such as, for example, a data processing system having a processor and memory that performs actions specified by software programs stored within the memory. As used herein, the term "speech-enabled email client" refers to a voice assistant capable of accessing email on a device such as, for example, Siri a Web-based email application that supports interaction with voice where the application is accessed through a browser and interacts with a server component (both components make up the email client) or any application that is capable of rendering a received email using speech. It is contemplated that the email client may be stored on any device including, but not limited to, a PC, mobile device, tablet and watch.

Speech Body Content in Email

FIG. 5 shows a source of an exemplary speech enhanced email message containing parts that may be present in an email message for reading, in accordance with an embodiment of the present invention. Various portions of the example email may be present or omitted in email messages that are processed by the speech-enabled email client and a speech-enabled email client may choose to use any part of a message or multiple parts of the message.

In one embodiment of the invention, speech content may be included as a MIME part in the email in a multi-part MIME formatted email. When speech content is included or referenced within a MIME part and is used by a speech-enabled email client to output or play instead of an HTML or plain text part, it is referred to as speech body content. Speech content as defined in this disclosure may comprise speech markup containing text, prosody, phonetics and phonemes to aid a speech-enabled email client to pronounce certain words in the text. Speech markup may also contain references to binary encoded audio to be played when rendering content in the speech markup. Speech content may also comprise binary encoded audio that is tagged or labeled for playback by a speech-enabled email client.

Figure 2:
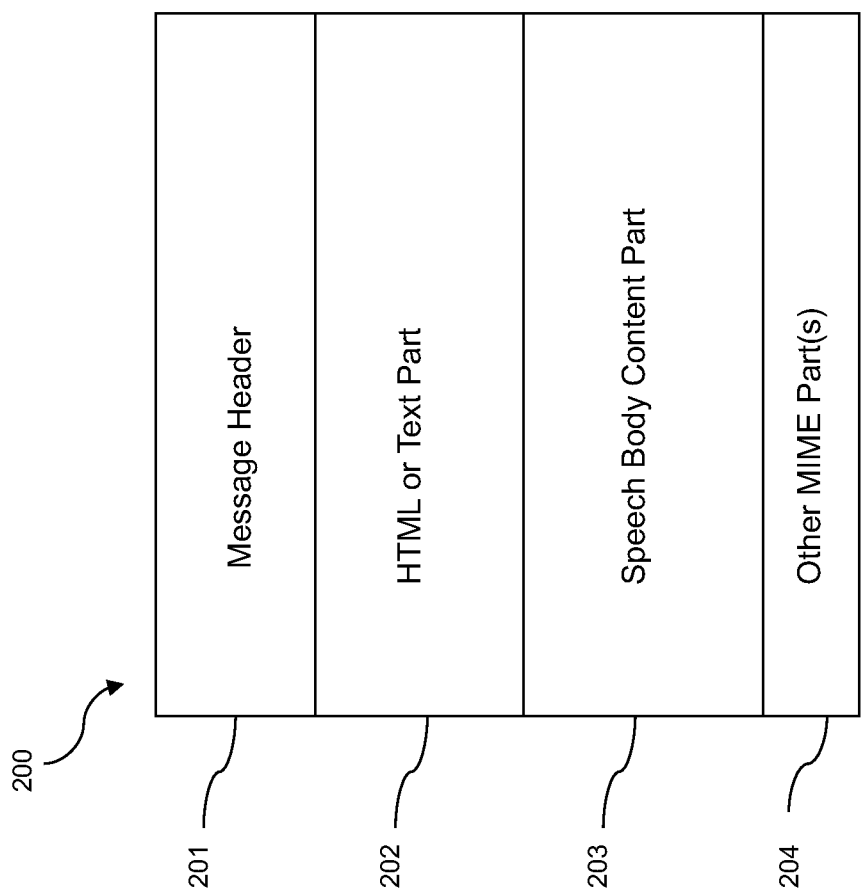
FIG. 2 is a diagrammatic view of an embodiment of a speech-enhanced email format in which alternative speech content are included in the email.

The speech body content is placed as a separate part in the email from an HTML or plain text MIME part. Referring to FIG. 2 a diagrammatic view of an embodiment of a multi-part speech-enhanced email consisting of a message header 201, at least an HTML or plain text part wherein an HTML part is defined by a Content-Type of "text/html" 509 and a plain text part is defined by a Content-Type of "text/plain" 508, in which speech body content are included in the email as a separate part 203. Other content 204 such as attachments may also be included in the email. In one embodiment of the invention the Content-type of the email 507 is "multipart/alternative" wherein alternative parts of an email may be selected to be used by an email client.

In one embodiment, speech body content in an email may comprise various alternative forms discussed below.

Speech Markup

Speech content may comprise speech markup, also called speech-annotated text, that allows for speech-enabled email clients to synthesize text within said speech content to speech. The markup aids the text to speech synthesis in areas such as prosody (providing markers to tell the speech-enabled email client to modify the pitch or rate of speech), phonetics and phonemes (using phonetic alphabets such as the International Phonetic Alphabet (IPA) to tell the speech-enabled email client how to pronounce names and words). Various speech markup formats may be used, including Speech Synthesis Markup Language (SSML).

In one embodiment of the invention, the speech markup content may be placed in a MIME part 511 wherein the MIME part content header comprises a special speech synthesis markup label to enable speech-enabled email clients to select said content for speech rendering instead of the default HTML or plain text content.

The following is an example of a MIME content header within a MIME part denoting speech markup 510. The following example comprises SSML markup with a phoneme tag that instructs the speech-enabled email client how to pronounce the brand name "Hermes". The alphabet attribute denotes the type of pronunciation scheme where a value of "ipa" may signify the International Phonetic Alphabet and a "ph" attribute which contains the pronunciation of the brand "Hermes".

Content-Type: x-speech-synthesis/ssml
    <speak>Get to the <phoneme alphabet="ipa" ph="/ɛ ə r'mɛz/">Hermes</phoneme> store this Saturday where there are lots of new styles to try out!</speak>

This is an example of phonetic markup.

Audio Content

In another embodiment of the invention speech content comprises one or more binary encoded audio content attached to said email. In the case of speech body content, a MIME content header may be specifically labeled for example with a specific Content-Type like "x-speech-playback/mp3" to enable speech-enabled email clients to select said audio content for playback when an email is selected for reading. Said audio content may be encoded as an audio format such as mp3 and appended as a MIME part using an encoding such as base64. In one embodiment, the speech enabled email client may ignore other audio content not labeled with a specific label.

The following is an example of a MIME content header denoting speech body content containing binary encoded audio content for playback 511:

Content-Type: x-speech-playback/mp3
    Content-transfer-encoding: base64
    T2dnUwACAAAAAAAAAAA . . . (truncated for brevity)

Remote Content

In another embodiment of the invention speech markup or binary encoded audio content may be resident on a remote server such as a sender content server 107.

The following is an example of a MIME content with header denoting speech markup resident on a remote server 512, wherein the speech-enabled email client may retrieve to process for output or played as speech content to a user.

Content-Type: x-speech-synthesis/ssml-url
    url:http://server.com/speech-content.ssml The following is an example of a MIME content with header referring to binary encoded audio file 513 resident on a remote server:

Content-Type: x-speech-playback/mp3-url
    url:http://server.com/speech-content.mp3

Speech Summary Content in Email

In an embodiment of the invention, the speech-enabled email client may also identify alternate content for other parts of the email including but not limited to the sender and subject line of an email.

Sender

It would be advantageous for speech markup or audio to be used to identify a sender of a message as often the speech-enabled email client is unable to properly pronounce names of senders based on the name of the sender in the "From" header 501. When speech markup containing pronunciation phonemes or binary encoded audio is used as a means to announce the identity of a sender by a speech-enabled email client, it is regarded as an audible sender identifier.

For example, the service Uber may have a sender "From" header 501 such as:

From: Uber <uber@newsletters.uber.com>

In one embodiment of the invention instead of attempting to pronounce a name of a sender a speech-enabled email client extracts a speech sender header 505 within a speech enhanced email containing a phoneme pronunciation for the sender name and uses the pronunciation specified in the speech sender header when reading the sender of the email.

An example of a speech sender header is illustrated below wherein the header is named "X-Sender-Name-Phoneme" with several attributes. The alphabet attribute denotes the type of pronunciation scheme where a value of "ipa" may signify the International Phonetic Alphabet and a "ph" attribute which contains the pronunciation of the sender's name (Uber).

X-Sender-Name-Phoneme: alphabet="ipa"; ph="/'u.b ə (])/"

Alternatively, the speech sender header may comprise speech markup such as SSML.

In another embodiment of the invention, binary encoded audio may be used instead of a phoneme identified by an alternative speech sender header such as specified below wherein a CID attribute refers to an attachment MIME part containing audio with a Content-ID attribute matching the CID attribute. The speech-enabled email client may play the referred binary encoded audio instead of attempting to convert the textual name specified in the from header into speech.

X-From-Name-Audio: CID="uber-audio"

In another embodiment, an audio file may be located on a remote server wherein the from name speech header contains a URL reference to the audio file 506.

X-From-Name-Audio-URL: https://server.com/uber-audio.mp3

DNS Based from Name Speech Substitution

In a further embodiment of the invention the audible sender identifier may be recorded as a DNS Resource Record on a Domain Name Server (DNS) associated with the domain (i.e. foo.com) of a sender of the email with a special subdomain (i.e. _speechidentity) reserved for the record for the audible sender identifier:

_speechidentity.foo.com

The DNS Resource Record may be a TXT record that refers to the audible sender identifier and is tied to the identity of a sender or domain of the sender. The example below shows two examples of audible sender identifier DNS TXT records. The "v" attribute denotes the version of the record, the alphabet attribute denotes the phoneme scheme such as the International Phonetic Alphabet(ipa) and the ph attribute denotes the phoneme.

Phoneme Based TXT Record (Amazon)
    "v=SPEECH1; alphabet="ipa" ph=/'æm ə ,zɒ n/"

Audio File Based TXT Record (Amazon)
    "v=SPEECH1; url=https://server.com/names/amazon.mp3"

In one embodiment of the invention, when the speech-enabled email client is preparing to speak the sender name of an email, it checks to see if an email has successfully been authenticated with an authentication scheme such as the DomainKeys Identified Mail (DKIM). If the email has been successfully identified, it then makes a query to check an audible sender identifier record exists for the domain in DNS and if one exists, it retrieves the speech phoneme or binary encoded audio and renders audio based on the audible sender identifier instead of attempting to convert the name in the "From" header 501 of the email into speech. Alternatively, the speech-enabled email client first queries a whitelist database to see if the sender or sender's domain has been allowed to use an audible sender identifier before rendering the audible sender identifier into audio. If the whitelist dictates that a sender or domain is permitted to use an audible sender identifier then the audible sender identifier is converted to audio and output or played, otherwise the sender name in the email's "From" header is converted to speech and output.

In another embodiment of the invention, a chime audio file is referenced in the DNS record which is subject to the same processing rules as an audible sender identifier with the exception that instead of omitting the speaking of the name of the sender in the "From" header (in the case of the audible sender identifier), the chime is played immediately before or after the speaking of the name of the sender in the "From" header. In one embodiment of the invention, the chime is short lasting fewer than 3 seconds.

Audio Chime File Based TXT Record (Amazon)
"v=SPEECH1; chime=https://server.com/names/amazon-chime.mp3"

In one embodiment of the invention, an audible sender identifier record header 504 may be added to an email header denoting that the sender has an audible sender identifier record in the DNS. When authenticating the email, the speech enhanced email client (or a process that performs the authentication prior to being accessed by the speech enhanced email client) may detect the audible sender identifier record header and validates that such a record exists and passes authentication. The result of the verification of the audible sender identifier record may then be appended to the email header. A speech-enabled email client may also use the existence of an audible sender identifier record header to query the DNS for the audible sender identifier record and to use the record to retrieve the audible sender identifier.

Audible Sender Identifier Used for Email Search by Sender

In a further embodiment of the present invention an audible sender identifier may be used as a model for speech recognition. A speech enhanced email client or may retrieve an audible sender identifier and convert the speech markup or binary encoded audio into a speech recognition model that can be used by a speech recognition engine to match a user's utterance to a sender name. Such models and techniques to convert phonemes and audio to such models are familiar to those skilled in the art. Speech recognition models may comprise Hidden Markov Model (HMM) and may be represented statically as Weighted Finite State Transducers (FST). When emails are processed by a speech-enabled email client for example when emails are retrieved from a user's account, the audible sender identifiers associated with the processed emails may be retrieved and converted into a speech recognition model and stored in a database with the model linked to the sender's name or the sender's email address. Later when a user requests the speech-enabled email client to locate emails based on a name of a specific sender, the user's utterance of a sender may be matched with a stored model of a sender and the sender identity located. Then a search through a user's email account may be done to locate emails from a sender using a textual search for a sender name or sender's email address tied to the matched model. In another embodiment of the invention, the audible sender identifier is only converted to a speech recognition model and stored after the associated message and sender has successfully passed email authentication such as DomainKeys Identified Mail (DKIM).

Subject

Often names are present in an email subject that a speech-enabled email client has trouble pronouncing. It would be advantageous to allow a speech-enabled email client to select an alternative subject that contains speech markup that provides pronunciation instructions of terms and names referred herein as a speech subject header.

Speech Markup Subject

In one embodiment of the invention a speech subject header containing speech markup 503 with pronunciation of names using phonemes is added to an email. If the speech-enabled email client locates such a speech subject header, it will use the content within the header to generate the audio when speaking the subject instead of the content within the email's "Subject" header 502. The example below is an example of a speech subject header containing speech markup with phonemes to help the speech-enabled email client to pronounce the name of the Hermes brand, wherein the alphabet attribute denotes the phoneme scheme such as the International Phonetic Alphabet(ipa) and the ph scheme denotes the phoneme.

X-Speech-Subject-SSML: Shop new scarfs at the at the <phoneme alphabet="ipa" ph="/ɛər'mɛz/">Hermes</phoneme> store this Saturday.

Speech Audio Subject

In one embodiment of the invention a speech subject header containing binary encoded audio that is to be used instead of the subject when voiced by a speech-enabled email client. If the speech-enabled email client locates such a header, it will play the binary encoded audio instead of converting the text of the "Subject" header to speech. When referring to binary encoded audio, the speech subject header may either refer to an audio file located on a remote content server through a URL reference or a binary encoded audio attachment within the email. The following example is a speech subject header with a url of an audio file located on a remote server that the speech-enabled email client may retrieve and play instead of converting the text in the "Subject" header to speech.

X-Speech-Subject-URL: http://server.com/subject1000.mp3

Processing for Message Listing

Figure 3:
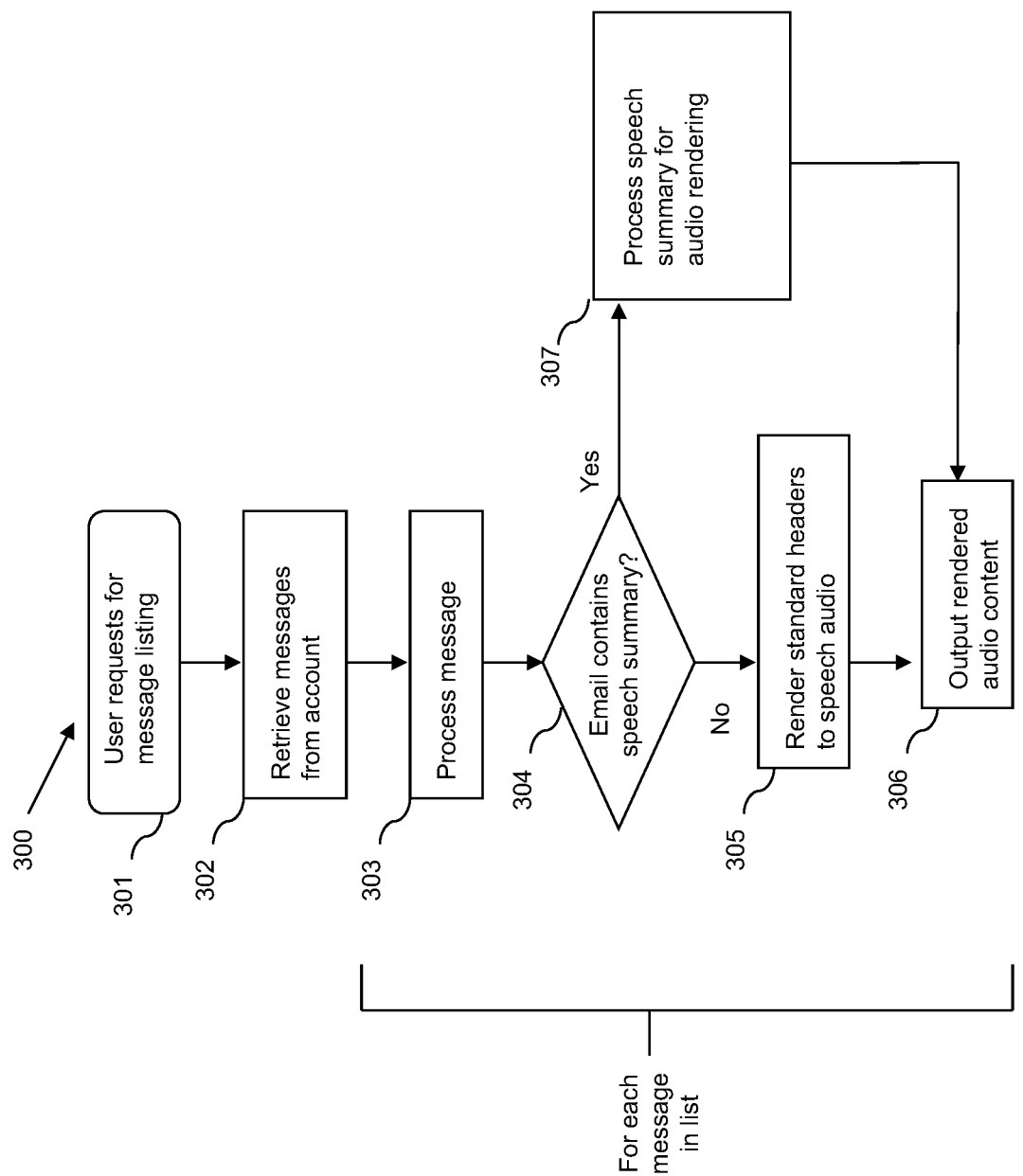
FIG. 3 is an illustration of an exemplary process flow, depicting the process of processing a plurality of email messages for reading in a list, in accordance with an embodiment of the present invention.

FIG. 3 is an illustration of an exemplary process flow 300, depicting the process of processing a plurality of email messages for reading in a list, in accordance with an embodiment of the present invention. Starting at step 301 the user requests from a speech-enabled email client to read out a list of messages in his inbox. This may be done with the user uttering a request like "Siri, read me my emails".

At this point the speech-enabled email client is already configured with the necessary login information in order to connect to the email account of a user and access his or her account.

Upon hearing the command to read email from a user, the speech-enabled email client connects to a user's email account and retrieves the emails linked to the account 302. At this point the speech-enabled email client may apply filters if specific kinds of emails are requested (i.e., "Siri read me emails from Sam Smith" or "Siri, read me my NEW emails"). Methods to filter emails are known to those skilled in the art. To speed up the retrieval of emails for the message list, only message summaries may be requested from the email account containing a subset of information within the emails such as the message header but not the body. Techniques to access email accounts are familiar to those skilled in the art and may include but not limited to IMAP and POP.

The following steps are performed for each message:

Each email is then processed 303 wherein the speech-enabled email client detects if there are audible sender identifiers or speech subject headers heretofore referred collectively as speech summary content. If speech summary content is located, using techniques identified earlier in the disclosure, in one embodiment of the invention, the speech-enabled email client may check if the sender or the sender's domain is in a whitelist that allows substitute speech content to be used as well as whether the email has successfully passed authentication.

If speech summary content is not located or playing the speech summary content is not allowable due to authentication failure or policy set in a whitelist 304, the name in the "From" header or "Subject" header may be used 305 to convert text to speech. The resulting audio is then output or played 306 to the user.

If speech summary content is found in an email and in one embodiment of the invention the speech summary content is allowable due to passing of authentication and whitelist policy, the summary speech content is retrieved 307 and converted to audio. The resulting audio is then output or played 306 to the user.

In one embodiment of the invention, in step 303, if the speech-enabled email client detects speech summary content in the email but the sender or domain of a sender of the email is not in a whitelist allowing the use of speech summary content, the speech-enabled email client may prompt the user of a choice to use the speech summary content with a voice prompt such as:

"This message is speech enhanced, do you want to hear the speech enhanced version?"

If the user replies in the affirmative, the speech enhanced email client may then play back the speech summary content.

In another embodiment of the invention, the speech-enabled email client may prompt the user to add the sender to a whitelist so that speech summary content in future emails from a sender will automatically be played with a voice prompt such as:

"Do you want to play the speech enhanced version in future messages of this sender?"

If the user replies in the affirmative, the speech enhanced email client may then add the sender or the domain of the sender to the whitelist.

There may be multiple whitelists used by the speech-enabled email client maintained by multiple parties. There may be a local whitelist that is only specific to the user, and there may be a community whitelist maintained by a third party.

The mail client may also prompt the user to determine whether to always play the speech-enhanced version of all the user's email messages, or whether to play the speech-enhanced version of emails from a mailing list or from type of email (e.g., advertisements or e.g., from friends)).

Processing for Message Reading

Figure 4:
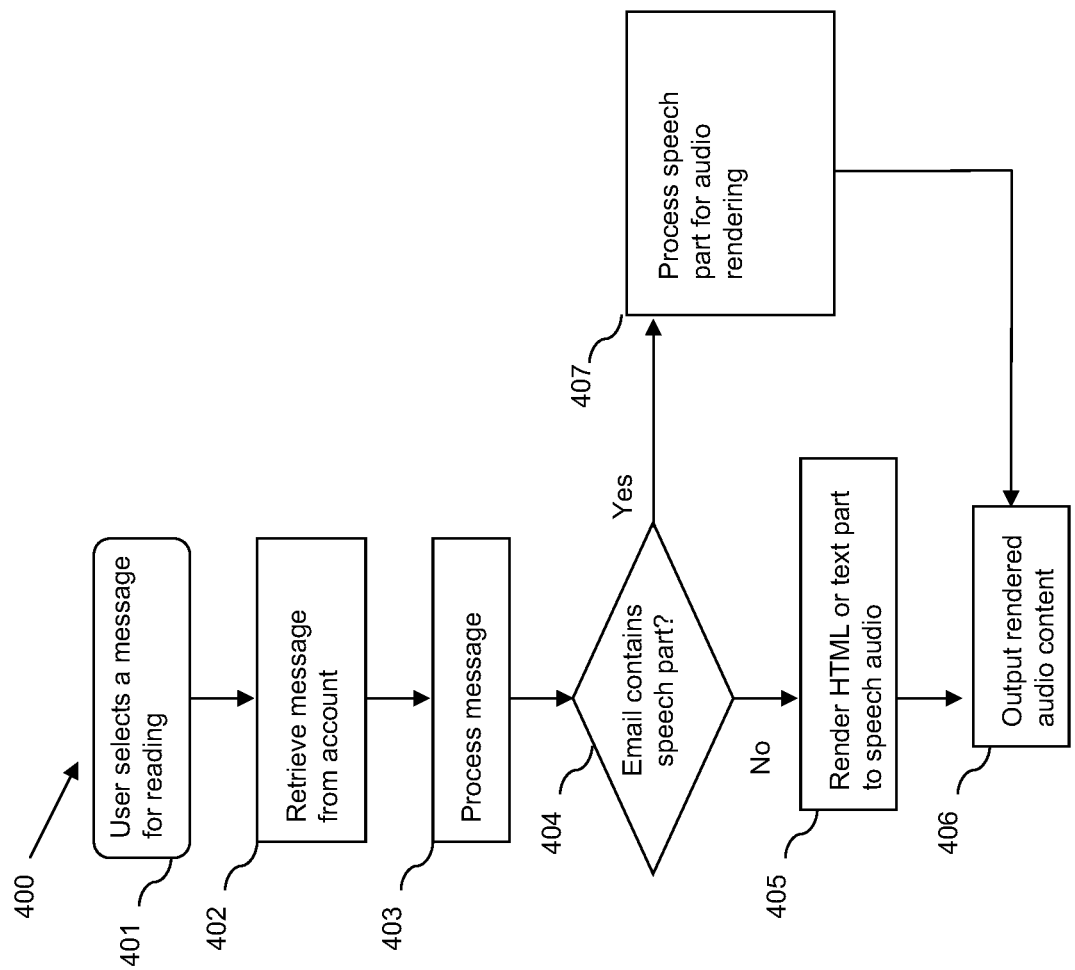
FIG. 4 is an illustration of an exemplary process flow, depicting the process of processing an email message for reading, in accordance with an embodiment of the present invention.

In FIG. 4 is an illustration of an exemplary process flow 400, depicting the process of processing an email message for reading, in accordance with an embodiment of the present invention.

Starting at step 401 the user requests from a speech-enabled email client to read a specific email. The user may make the request while the speech-enabled email client is reading the summary of messages on a message list or when reading an email displayed on a screen or by other navigational means. This may be done with the user uttering a request like "Siri, read next email".

At this point the speech-enabled email client is already configured with the necessary login information in order to connect to the email account of a user and access his or her account. The email would be spoken in accordance with the speech part of the email. As another example, the user might interrupt Siri's listing on email subject lines with a command such as:

"Siri, read this email"

Meaning that Siri should use speech to present the current email. The email would be spoken in accordance with the speech part of the email.

Upon hearing the command to read email from a user, the speech-enabled email client connects to a user's email account and retrieves the email specified by the user request 402. Techniques to access email accounts are familiar to those skilled in the art and may include but not limited to IMAP and POP.

The email is then processed 403 wherein the speech-enabled email client detects if there are speech body content in the email message using techniques identified earlier in the disclosure. In one embodiment of the invention, the speech-enabled email client may check if the sender or the sender's domain is in a whitelist that allows speech content to be used as well as whether the email has successfully passed authentication.

If speech body content is not present in the email or is not allowable due to authentication failure or policy set in a whitelist 404, a standard body part comprising either an HTML MIME part 509 or plain text MIME part 508 are used 405 to generate speech audio by converting the text or HTML markup into speech using text to speech or HTML to speech audio. Techniques to convert HTML or text to speech are familiar to those skilled in the art. The resulting audio is then output 406 or played to the user.

If speech body content exists and in one embodiment of the invention is allowable due to passing of authentication and whitelist policy, the speech body content is retrieved 407 and converted to audio. The retrieval and conversion of speech body content is covered earlier in this document. The retrieved content to be converted to audio may be a speech markup comprising SSML or a binary encoded audio attachment or an audio file. The resulting audio is then output 406 or played to the user.

In one embodiment of the invention, in step 403, if the speech-enabled email client locates speech body content in the email but the sender or domain of a sender of the email is not in a whitelist allowing the use of speech body content, the speech-enabled email client may prompt the user of a choice to use the speech body content with a voice prompt such as:

"This message is speech enhanced, do you want to hear the speech enhanced version?"

If the user replies in the affirmative, the speech enhanced email client may then play back the speech body content.

In another embodiment of the invention, the speech-enabled email client may prompt the user to add the sender to a whitelist so that speech body content in future emails from a sender will automatically be played with a voice prompt such as:

"Do you want to play the speech enhanced version in future messages of this sender?"

If the user replies in the affirmative, the speech enhanced email client may then add the sender or the domain of the sender to the whitelist.

There may be multiple whitelists used by the speech-enabled email client maintained by multiple parties. There may be a local whitelist that is only specific to the user, and there may be a community whitelist maintained by a third party.

Alternate Speech Content Format

FIG. 6 shows a source of an HTML 601 part of an exemplary speech enhanced email message wherein speech content is embedded within HTML (embedded speech content) containing parts that may be present in an email message for reading, in accordance with an embodiment of the present invention. For example, the exemplary speech enhanced email message contains text within a heading tag 602 and further includes visible text 603, which may be displayed by a non-speech-enabled email client. Various portions of the example email may be present or omitted in email messages that are processed by the speech-enabled email client and a speech-enabled email client may choose to use any part of a message or multiple parts of the message.

Embedded speech content comprises content that is embedded within an HTML content part of an email wherein said content is hidden from regular email clients. In on embodiment, an email has multiple parts, including for example, a block of context with speech information such as the speech block described below. In one embodiment of the invention a speech-enabled email client detects the presence of speech content by locating a block of content within a special tag such as <speech-block> tag 606 and interpreting content within as speech content. Embedded speech content may be hidden from regular email clients or email clients that render HTML by wrapping embedded speech content starting at 605 within a specially coded comment tag <!-[SPEECH] 604 and→614. Other methods to hide content from being visually displayed within a browser may be used such as hiding such code inside a script tag or by styling a wrapper HTML element with a "display: none" CSS style.

In one embodiment of the invention embedded speech content may contain alternate forms of aforementioned content such as speech sender header 606, speech subject header 607, speech body content 608 and remote speech body content 609. A speech-enabled client may treat each of these content 606, 607, 608, and 609 in a special way, such as treating the content in accordance with rules specific to the existence of or terms in the sender 606, rules specific to the existence of or terms in the subject 607, rules specific to the existence of or terms in the body content 608, and/or rules specific to the existence of or terms in the body content 609.

In one embodiment of the invention a speech engagement beacon 610 is embedded within speech content wherein said beacon is a URL to a remote server, wherein a request is made to said URL when an email has been read. To ensure privacy for a recipient in one embodiment of the invention, the recipient is prompted for permission prior to a request being made to said URL with a prompt like:

"Would you like to let the sender know that you have read emails from this sender?"

If the user responds with a positive utterance such as "Yes", a record for the sender may be added in the speech-enabled email client to automatically make a request to one or more speech engagement beacons URLs within any email from a sender once the speech-enabled email client has started reading the content. Speech engagement beacons may contain encoded information that identifies a specific email campaign as well as the recipient of the email.

Reading by Sections

In one embodiment of the invention a speech-enabled email client may detect special speech labels 611,612,613 within sections of email content, wherein words within such labels may be used as anchors by the speech-enabled email client. A section of email content may be associated with a speech label by being enclosed a parent element having a speech label attribute. Other methods of labeling sections of content may be used such as specifying speech sections and labels within JSON structures. Sections of email content associated with a speech label may comprise speech markup, audio or regular HTML.

When a speech-enabled email client is reading an email, if the email contains speech labels, the speech-enabled email client may prompt the user if the user wants to skip to a specific section with an utterance like "This email contains sections, would you like a list of sections?"

The user may respond with a positive confirmation such as "Yes". Alternatively a user may simply ask for a list of sections when an email is read such as:

"List sections within this email".

If a positive confirmation or a request to list speech sections is detected, the speech-enabled email client may read the list of words referenced in the label attributes (i.e., "new arrivals" 611, "personalized" 612, "sales" 613).

In one embodiment of the invention, a user may direct a speech-enabled email client to read a section of email content associated with a speech label by either speaking the word in the label after listening to a listing of speech labels or at any time during a reading of an email by using a "jump to" phrase followed by the label name, like the following utterance.

"Jump to sales"

In reference to the example in FIG. 6 613, the speech-enabled email client may then respond by reading the associated content.

"Laptop memory and HDMI cables are on sale this week"

A "jump to" phrase may be any keyword (i.e., "jump to", "skip to", "go to") that a speech-enabled email client uses to detect a user's request to read a specific section within an email associated with a speech label.

In one embodiment of the invention speech engagement beacons may also be associated with speech labels wherein the speech-enabled email client may request a URL denoted by a speech engagement beacon associated with a speech label upon the request of the reading of a specific section using a speech label by a user. The speech engagement beacon may additionally contain additional encoded content denoting the section of content read.

General

It will be appreciated by those of ordinary skill in the art that any configuration of the particular machine implemented as the computer system may be used according to the particular implementation. The control logic or software implementing the present invention can be stored on any machine readable medium locally or remotely accessible to a processor executing instructions to implement the embodiments discussed herein. A machine-readable medium includes any mechanism for storing information in a form readable by a machine (e.g. a computer). For example, a machine-readable medium includes read-only memory (ROM), random access memory (RAM), magnetic disk storage media, optical storage media, flash memory devices, or other storage media which may be used for temporary or permanent data storage.

The invention can apply to other forms of messaging applications like Chat, SMS, Social Media Direct Messaging and proprietary forms of messaging.

The present invention may also be embodied in a handheld or portable device containing a subset of the computer hardware components described above. The handheld device may be configured to include a set of buttons or input signaling components with which a user may select from a set of available options.

In this specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method performed by a speech-enabled email client, comprising:
   receiving, at the speech-enabled email client, an email sent to a user, the email comprising a plurality of plain text headers including a "from" header containing a sender name, the email further comprising data identifying a DNS record,
   wherein the DNS record is a TXT record that includes an attribute specifying a resource location comprising a location of a pre-recorded DNS-based binary audio file on a network, the DNS record associated with the sender name in the "from" header, and
   wherein the DNS record includes data specifying that the DNS-based binary audio file is usable for audibly rendering the associated sender name;
   the speech-enabled email client determining whether the email contains the data identifying the DNS-based binary audio file; and
   when the speech-enabled email client determines that the email contains the data identifying the DNS-based binary audio file for the "from" header and that the sender domain is included in a whitelist, in response to a user request to the speech-enabled email client, retrieving the DNS-based binary audio file via DNS resolution and playing the DNS-based binary audio file instead of converting the "from" header text to speech using TTS.

2. The method of claim 1, wherein the user request is a request to play a summary of a list of emails.

3. The method of claim 1, wherein the user request is a request to play at least the email.

4. The method of claim 1, wherein the location of the pre-recorded DNS-based binary audio file is stored as a URL.

5. The method of claim 1, wherein the DNS record includes phoneme-based pronunciation data for the sender name in the "from" header.

6. The method of claim 5, wherein the speech-enabled email client prioritizes retrieval of a pre-recorded binary audio file over phoneme-based pronunciation data when both exist in a DNS record.

7. The method of claim 1, wherein the DNS record is associated with the sender domain.

8. The method of claim 1, wherein the speech-enabled email client retrieves the DNS record for the sender domain only if the email has been authenticated using an authentication scheme.

9. The method of claim 8 wherein the authentication scheme is DomainKeys Identified Mail (DKIM).

10. The method of claim 9 wherein the location of the pre-recorded binary audio file is a TXT record associated with a subdomain of the sender domain.

11. A system, comprising:
   a speech-enabled email client, that:
      receives, at the speech-enabled email client, an email sent to a user, the email comprising a plurality of plain text headers including a "from" header containing a sender name, the email further comprising data identifying a DNS record,
      wherein the DNS record is a TXT record that includes an attribute specifying a resource location comprising a location of a pre-recorded DNS-based binary audio file on a network, the DNS record associated with the sender name in the "from" header, and
      wherein the DNS record includes data specifying that the DNS-based binary audio file is usable for audibly rendering the associated sender name;
      determines whether the email contains the data identifying the DNS-based binary audio file; and
      when the speech-enabled email client determines that the email contains the data identifying the DNS-based binary audio file for the "from" header and that the sender domain is included in a whitelist, in response to a user request to the speech-enabled email client, retrieves the DNS-based binary audio file via DNS resolution and plays the DNS-based binary audio file instead of converting the "from" header text to speech using TTS.

12. The system of claim 11, wherein the location of the pre-recorded binary audio file is stored as a URL.

13. The system of claim 11, wherein the DNS record includes phoneme-based pronunciation data for the sender name in the "from" field.

14. The system of claim 13, wherein the speech-enabled email client prioritizes retrieval of a pre-recorded binary audio file over phoneme-based pronunciation data when both exist in a DNS record.

15. The system of claim 14, wherein the DNS record is associated with a domain name of an email address of the sender.

16. The system of claim 11, wherein the speech-enabled email client retrieves the DNS record for the sender domain only if the email has been authenticated using an authentication scheme.

17. The system of claim 16 wherein the authentication scheme is DomainKeys Identified Mail (DKIM).

18. The system of claim 17 wherein the location of the pre-recorded binary audio file is a TXT record associated with a subdomain of a domain of the sender.

* * * * *